United States Patent [19]
von Nordenskjöld

[11] Patent Number: 4,797,212
[45] Date of Patent: Jan. 10, 1989

[54] BIOLOGICAL PURIFICATION OF WASTE WATERS

[76] Inventor: Reinhart von Nordenskjöld, Am Jadweg 4, 8011 Solalinden, Fed. Rep. of Germany

[21] Appl. No.: 62,479

[22] Filed: Jun. 15, 1987

[30] Foreign Application Priority Data

Jun. 13, 1986 [EP] European Pat. Off. .......... 3619954.0

[51] Int. Cl.$^4$ .............................................. C02F 3/20
[52] U.S. Cl. ................... 210/614; 210/628; 210/752; 210/96.1; 210/199; 210/903; 261/121.1
[58] Field of Search .............. 210/614, 752, 96.1, 210/199, 629, 626, 739, 747, 101, 102, 134, 142, 903, 628; 261/121.1

[56] References Cited

U.S. PATENT DOCUMENTS

| | | | |
|---|---|---|---|
| 3,808,123 | 4/1974 | Neel | 210/614 X |
| 3,897,334 | 7/1975 | Murphy | 210/614 X |
| 4,159,243 | 6/1979 | Okey | 210/199 X |
| 4,287,062 | 6/1975 | von Nordenskjold | 210/199 |
| 4,425,231 | 1/1984 | Fujimoto | 210/614 X |
| 4,707,254 | 11/1987 | Vellinga | 210/199 |

FOREIGN PATENT DOCUMENTS

| | | |
|---|---|---|
| 0145647 | 5/1984 | European Pat. Off. . |
| 1141 | of 1915 | United Kingdom . |
| 9989 | of 1915 | United Kingdom . |

*Primary Examiner*—Tom Wyse
*Attorney, Agent, or Firm*—Brumbaugh, Graves, Donohue & Raymond

[57] ABSTRACT

In the particular embodiments of the waste water treatment system described in the specification, a waste water treatment basin has spaced-apart, moving aerator chains extending across the basin in a direction transverse to the flow of waste water through the basin. When an aerator chain is provided with air, bottom aerators suspended from the chain adjacent to the bottom of the basin move with respect to the basin to mix sludge collected on the basin with the waste water and to supply air to the waste water. A control system supplies air selectively to the aerator chains to provide zones of full aeration and intermediate zones with little or no aeration and the selection of the aerator chains is changed periodically in a progressive manner along the basin so that the zones move progressively through the basin. As a result, sufficient air is supplied to the waste water in the basin for purification of the waste water and to maintain sludge in suspension as required in the waste water at minimum expense of energy. In addition, the oxygen potential of the waste water in the zones is controlled so that successive reactions relating to the purification process are accomplished in successive zones, for example, including nitrification of the waste water in zones having a relatively high oxygen potential and denitrification in adjacent zones having relatively low oxygen potential. Phosphorus removal is accomplished in a similar manner.

18 Claims, 2 Drawing Sheets

BIOLOGICAL PURIFICATION OF WASTE WATERS

BACKGROUND OF THE INVENTION

The invention relates to the area of advanced biological treatment of waste waters.

The invention also relates to a device for the execution of such a treatment.

U.S. Pat. No. 4,287,062 issued Sept. 1, 1981 to von Nordenskjold describes a biological process using several floating aerator chains spaced apart with respect to each other and moving back and forth which produces a wide-area and uniform aeration and mixing of the waste water containing activated sludge. These plants are characterized, in particular, by the fact that a controlled low loaded activated sludge process can be carried out preferably in earthen basins and without total mechanical mixing of the basin content, i.e., a very wide variety of living conditions for the activated sludge in the basin can be controlled at any time with a comparatively small expenditure of energy.

In the known activated sludge plant the air is introduced into the basin simultaneously through all available bottom aerators for aeration and mixing so that the air is equally distributed along the length of the basin. The movement of the chains accomplishes, among other things, that the activated sludge does not settle at any point of the basin long enough to be damaged.

The bottom aerators, extending as far as the bottom, which pass over the bottom of the tank with a reciprocating movement in the case of the known plant, pick up the activated sludge, circulate it, and also tear it away from the bottom locally by means of the ascending stream of air and water, and thereby also prevent any settled part of the activated sludge from becoming anaerobic by remaining on the bottom sufficiently long to develop negative effects.

Despite the comparatively low specific mixing energy expenditure of this system, it may happen during periods of low load, such as, for example, during night hours, on weekends, etc., that more energy is consumed for the mixing than would actually be necessary or even desirable for the oxygen supply. This leads to undesirable oxygen potentials in the basin, i.e., to an undesired effect on process steps requiring specific oxygen potentials. As used herein, the term "oxidation potential" means the ability of the waste water and its components to perform oxidating or reducing processes.

Waste water treatment plants which are equipped with fixed installed bottom aerators or which use nozzle-like mixing devices belong to the group "high loaded plants" which generally operate at a minimum energy level of 10-15 watts/m$^3$ basin volume. They also require a horizontal well-constructed basin floor so that the aerators which are supported by the floor will remain at the same horizontal level which is a requirement for an even introduction of air into the basin. There have been several attempts to operate such plants with intermittent airflow through the fixed aerators. Early attempts are described in British Pat. Nos. 1141 of 1915 to Jones and 9989 of 1915 to Naylor, and a later attempt is described in the published European Patent Application of Strassler, No. 0145647. Intermittent operation in such plants is accompanied by various problems. For example, most fixed installed aerators are prone to plugging, especially when they are operated intermittently. When pluggage occurs, then the whole basin has to be emptied to facilitate effective cleaning of the aerators. Thus, this leads to undesired downtime for the plant and high extra maintenance. In addition to the sludge which settles on the aerators when they are shut off, there is also sludge which settles around them. This sludge is difficult to resuspend and part of it remains on the floor and will die, which destroys the whole activated sludge process.

There are several specialized types of plants known to carry out processes which require specific oxygen potentials, e.g., nitrification, denitrification and phosphorus removal. It is known, for example, to operate a separate denitrification basin upstream as well as downstream of the aeration basin in an activated sludge plant. It is also known to have several basins connected in series so that the conditions in each basin can be controlled to permit each of the desired processes to be carried out.

It is also known that such processes can be carried out in circular or oval basins where the waste water is circulated and where, depending on oxygen supply, zones with different oxygen potential are established. To keep the activated sludge in suspension in this latter type of plant, the water must be circulated at a velocity of at least 0.3 meters per second with the help of mixing or pumping devices.

SUMMARY OF THE INVENTION

The purpose of the present invention is to provide a method and an apparatus to carry out the method which, at any time and under varying input demands, will produce not only secondary treatment but also carry out, in an optimum way in the same basin, processes which require specific oxygen potential specifically applicable activated sludge plants operating at low pollution load using earthen basins.

This purpose is accomplished by providing a method of biological treatment using a series of aerator chains distributed over the basin surface area generally perpendicularly to the direction of flow of waste water through the basin and supporting bottom aerators from the chains so that they are located in the vicinity of the basin floor. In operation, each of the aerator chains moves back and forth so that the bottom aerators suspended from it move across the basin floor periodically to aerate and mix the waste water and the activated sludge. At any time only some of the aerator chains are supplied with the full amount of air (i.e., are "fully loaded") while the air supply to the other chains is more or less throttled so that there is complete mixing of the waste water and the activated sludge only in the area of the fully loaded chains, and the full supply of air is varied among the chains so that different chains are fully loaded during specific time periods, preferably in a way so as to establish a pattern of migrating waves.

The method according to the invention using the moving on- and off-air loading of the moving aerator chains thus creates one or several migrating zones of intensive aeration passing through the basin separated by zones between the intensive aerated ones in which the aeration is much weaker or absent. The weaker zones, of course, migrate in the same way as the intensive aeration zones. Thus, the zones migrate continuously through the basin and certain reactions which take place because of conditions maintained in the migrating zones will be carried out repeatedly until the process is completed. For example, successive nitrification and denitrification of waste water can be accomplished with high efficiency by migrating zones of which some have nitrifying conditions and other have denitrifying conditions. Thus, the waste water passing through the basin is subjected to both the conditions required for both processes in succession a number of times.

Combining the movement of the bottom aerators with the periodic variations in loading of air flow through the aerator chains creates large advantages. Among these advantages are, for example, that simultaneous nitrification and denitrification of the waste water in the basin can be accomplished with a maximum oxygen level as low as 0.3 mg/l. This increases the stability of the operation of the plant and ensures, for example, that the oxygen potential quickly can reach denitrification levels when the next zone arrives. The creation of these migrating zones and the special processes which therefore become possible can be accomplished in the same basin without mechanical mixers in spite of the very low oxygen concentrations.

The action of the aerator chains causes mixing of the waste water in a vertical direction and affects a clearly defined horizontal area. This results, under correct circumstances, in well defined narrow zones which can be made to move as desired through the complete basin. Under the correct circumstances generally associated with the low energy input mad possible by the invention, there is very little mixing in the horizontal direction between the zones, which keeps the zones well defined. The waste water travels in the direction transverse to the zones from the inlet to the outlet of the basin.

The movement of the bottom aerators cleans the aerators from the point of view that sludge which has settled on the aerator while it was standing still is flushed off the aerator by the movement. Therefore, in spite of the fact that the aerators are shut off from time to time, they will not become plugged.

According to the invention, there is a combined effect resulting from using moving aerator chains supporting bottom aerators for both aeration and mixing and on the other hand operating only some of the aerator chains with a full air load. Selecting the time intervals for the migration of the zones and selecting the air flow rates makes it possible to vary the process conditions.

A plant which is operated in the way described can always be adjusted to operate in an optimum way for the process. For example, variations during times of low load which may occur due to incomplete sewer systems of growing communities, during night hours and during vacation times, can be accommodated by varying the number of chains supplied with a full air flow at any time.

The method according to the invention also allows controlled partial settling of activated sludge which is accompanied by almost no oxygen supply. As long as the time when the sludge is not supplied with oxygen is within certain limits, the activated sludge will not be negatively affected but, on the contrary, is caused to perform an even more effective treatment and nutrient removal. Since the moving bottom aerators sweep over the basin floor periodically, it is assured that all parts of the basin floor are swept within a certain period of time. As as result, any partly settled sludge in any area of the basin floor will be lifted into full suspension and included in the mixed waste water. The sludge, therefore, will not die off in any area of the basin floor, which is contrary to what happens in a basin with fixed aerators. Another noteworthy advantage compared to plants with fixed bottom aerators is that the method according to the invention permits reactions which demand low oxygen potential in the same basin as reactions which demand high oxygen potential. This is not possible for plants which only use fixed bottom aerators (that is, without mechanical mixers) as such plants normally operate with much higher energy input to promote mixing, which results in higher oxygen potential than that required for the low oxygen reactions.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
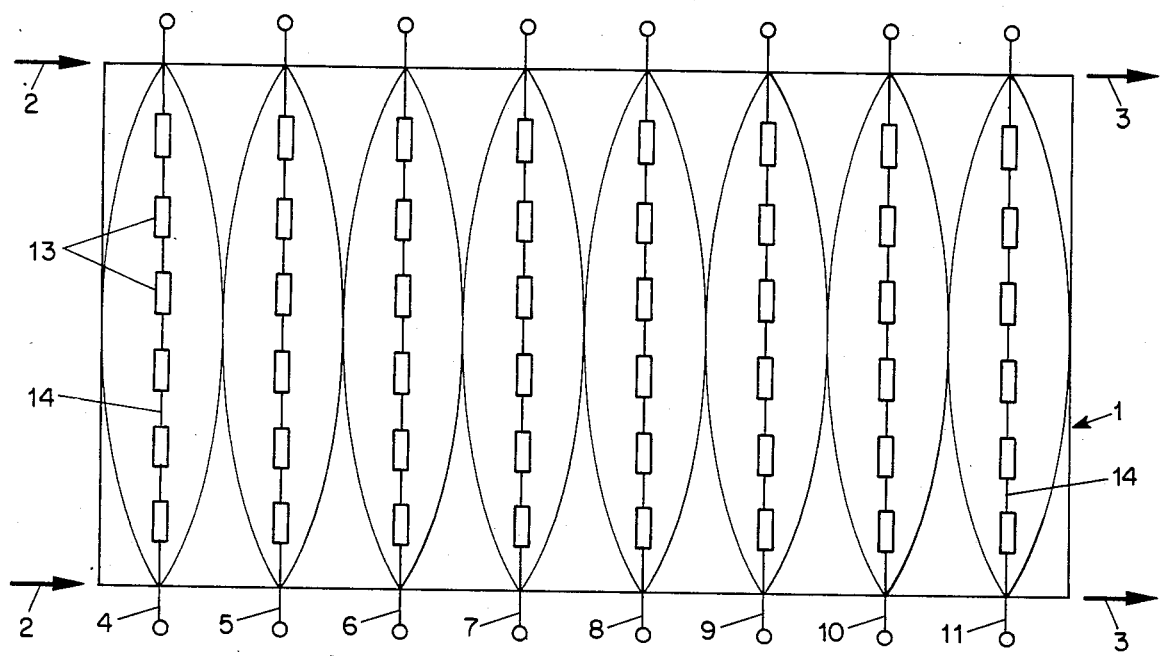
FIG. 1 is a schematic top view illustrating the arrangement of a representative waste water treatment basin arranged according to the invention showing the range of motion of the moving aerator chains and their areas of influence.

The load of the individual moving aerator chains in a waste water treatment basin of the type shown in the drawings can be optimally adapted according to requirements and can be carried out, for example, in such a way that, at a specific point in time, at least two aerator chains, separated by at least one less loaded aerator chain or a chain without any air load, are fully loaded and that then, after specific time intervals in each case, the next adjacent aerator chains in the same direction are loaded. If, for example, eight aerator chains are arranged side by side in a basin, then the operation may be started with a full load of air to the first and fifth aerator chains, while all other aerator chains are loaded only weakly or not at all. After a certain period of time, the second and sixth aerator chains are then fully loaded with air, while the other aerator chains, particularly the first and fifth, are then switched over to partial air loading or are completely switched off. This continues until finally the fourth and eighth aerator chains are fully loaded to create intensively aerated regions in the zones influenced by them. After this, the cycle starts again with the first and fourth aerator chains, etc.

Depending on the number of moving aerator chains present, the dimensions of the basin, the pollution load, or especially in the case of particularly heavy sludge, it is also possible, for example, to always fully load two adjacent aerator chains (an aerator-chain pair) at any point in time, and also another aerator-chain pair that is separated from the first aerator-chain pair by several weakly loaded aerator chains or chains without any air load. The migrating movement of the aerated zones which is superimposed on the movement of the individual moving aerator chains is then produced by switching off one aerator chain on one side of each pair and additionally switching on an aerator chain adjacent to the still fully aerated aerator chain on the other side.

It is also possible to load only a partial region of the basin in a migrating manner in order to operate the other parts with continuous load, either permanently or temporarily. It is also possible to load individual parts of the basin with different rates of migration or different intensities. This might be desirable, for example, if it is required to fully mix the waste water at the inlet region of the basin, either permanently or intermittently, while the remainder of the basin is subject to a migrating wave air load. If, on the other hand, it is desired to provide uniform oxygen potential near or in the outlet end of the basin, then the aerators in that region will be subjected to permanent or temporary continuous load, whereas, on the other hand, the remainder of the basin is subject to one or more migrating waves of aeration zones.

It is clear to one skilled in the art that the novel method using the moving aerator chains and the superimposed migrating aeration zones may be applied in ways other than in the examples just described, and that, especially with respect to the biological process conditions, it provides an enormous advance in the direction of operational capacities, adaptation and fine control, resulting in completely new process conditions in a waste water basin, which were impossible to achieve with the previous technique using fixed bottom aerators. This means that, with an assured supply of good and potent activated sludge available, there are new types of process methods possible which can only be accomplished with the plants described herein which are operating at a low energy level.

The time interval at which the moving aerator chains are loaded, and thus the migration velocity with which the intensive aeration regions migrate through the basin, is preferably controlled as a function of the oxygen potential, the load, and the sludge data. However, the migration velocity of the waves must, as a minimum, always be high enough so that activated sludge particles which settle on the bottom do not die off and are not damaged. In this way it is also possible to achieve an optimal adaptation to the particular sludge index, which indicates how heavy the sludge is, and the required minimum energy, which is dependent on this, can be supplied in each case.

It is also advantageous to control the number of fully loaded moving aerator chains as a function of the oxygen potential, the pollution load, and the sludge data of the waste water and sludge comprising the mixed liquor in the basin. The frequency of full load of the aerator chains, if, for example, it is controlled as a function of the pollution load, can then always be adjusted to the required oxygen demand in an optimal manner, with the smallest energy expenditure. It has been found that, in most cases, a wave migration velocity for which each aeration chain is fully loaded approximately one to ten times per hour is sufficient.

A further very advantageous arrangement of the procedure provides that the time intervals of full load and/or the number of fully loaded aerator chains are controlled automatically as a function of parameters important for the required oxygen input, such as instantaneous pollution load and sludge quantity. For the execution of a control loop of this type during operation, it is possible to measure different parameters that are important for the required oxygen input. Thus, for example, the inlet quantity ($m^3$/hour) or the inlet temperature T in the basin can be measured by means of suitable measuring instruments. It would also be possible, for example, to determine fluctuations of pH value in the intake or other strongly oxygen-consuming components by measurement techniques. It is also possible, for example, to measure the turbidity of the water. These measured results can then be transmitted to a central calculation unit, such as a computer, and can be appropriately evaluated so that the air load of the inividual aerator chains is then carried out automatically as a function of these measured results, possibly in accordance with a waste-water-specific or plant-specific program. Depending on the measured values obtained, it is then possible, for example, to introduce more oxygen locally, for example, in the inlet zone, or the oxygen input sources can be passed more rapidly through the basin. All of this permits an individual and in each case optimal operation of the plant, which with the specific process conditions selected allows the achievement of optimum treatment.

Another very advantageous development of the procedure provides that the quantity of oxygen introduced in each case through the number of fully loaded moving aerator chains which is less than the total number of chains may be larger than the oxygen input that would be supplied to that number of chains if all the aerator chains were fully loaded. This means that a larger quantity of air is discharged per aerator chain by the process according to the invention as compared with the quantity of air flowing to each aerator chain of a plant in which all aerator chains are operating with the same total air load. Let us assume that ten aerator chains are present in a conventional plant, which are all loaded simultaneously. Then, in contrast to this, in the process according to the invention, the air load is first reduced to, for example, a total of 50 percent. However, the air quantity is not distributed over five aerator chains, but only, for example, over two chains, so that in these the air input is significantly increased. In an extreme case, for example, only one aerator chain is loaded with this quantity for a short time. This concentrated air input leads to many advantages. On the one hand, for example, sludge islands present in a pond can be locally dispersed in this way.

For example, for a plant with ten moving aerator chains a tenfold airflow can be supplied to one aerator chain and this concentrated air introduction will still reach all parts of the floor by the movement of the single chain and by alternating the chain which is actually supplied with the increased airflow to migrate the increased airflow through the basin. On the other hand, this leads to the fact that the individual bottom aerators, because of the high specific air input taking place from time to time in combination with the cleansing effect of the movement itself, are kept free of blockages, because they are continuously "blown clean" by the increased air discharge and are subjected to a stronger cleansing effect as the movement becomes very fast. With moving aerator chains, this locally increased air input of the individual aerator chains leads to relatively large amplitudes of motion and thus to an intensive circulation of the sludge in the vicinity of the chain.

In the case of extremely intensive settling on the bottom, for example, after a prolonged power failure or other shutdown or after an extensive addition of fecal sludge or the like, it is also possible to concentrate the total air potential of the plant on a few rows of moving aerators, so that these are excessively loaded with air. In this case, a very strong circulation and churning wave migrates through the basin which, together with the movement of the individual chains, will reach all areas of the floor, and returns the plant back to its normal state.

A representative arrangement for execution of the activated sludge process according to the invention is characterized by the fact that, in every air supply line of a moving aerator chain, there is arranged a throttle valve controllable by a central control unit, which, upon command, throttles or blocks the air supply to the associated air supply line. A throttle valve associated with each air supply line in this way makes possible selected operation of the individual air supply lines of the moving aerator chains and a blocking or throttling of these lines. This creates the prerequisite for an individual control, in which the control can be carried out, for example, by means of a central control unit, by which both the time intervals and the number of moving aerator chains fully loaded at the same time can be variably adjusted. The great flexibility thus obtained with respect to the frequency and quantity in which the air is introduced makes possible a flexible adaptation to a very wide variety of loads and an excellent controllability in the sense of a wide variety of special process engineering conditions and variants, particularly of the activated sludge process, with the smallest possible energy expenditure.

In the apparatus according to the invention, it is possible to provide a fine control of the air flow rate in each aerator chain which is beneficial for carrying out the special waste water processing treatment in accordance with the invention. Such fine control cannot be accomplished using bottom-fixed aerators because the required constant external pressure of the waste water on the aerators cannot be assured without expenditure of energy. The reason is that the water level of the waste water in the basin is always changing, for example, during daytime operation, and also because the bottom of the basin may be uneven as a result of earth settling. In such situations, in order to assure equal pressure in each of the bottom aerators, an independent compressor would be required, which would be completely uneconomical. On the other hand, according to the invention, with bottom aerators suspended a fixed distance from the top of the water in the basin, the external pressure on all of the aerators is the same. This provides an unexpected simple way to permit fine control of the air supply in each aerator, which is helpful in providing the special waste water processing treatment in accordance with the invention.

In a specific design of such a system, each air supply line is formed by a hose line and the throttle valve is designed as a squeeze valve. The squeeze valve can be charged with air, for example, by means of a piston operated by compressed air. The individual squeeze valves can then be controlled, for example, through a central compressed air line and suitable valves. By varying the charging with air, the squeeze valve constricts the cross-section of flow in the hose line, so that the desired throttling of the quantity of air supply is achieved in an extremely simple manner.

The throttle valves together with the control unit can also be installed in existing plants, so that plants already in operation can also be converted in a simple manner to carry out the process according to the invention.

It can be advantageous if the air supply to the not-fully-loaded aerator chains is never shut off completely so that the possibility of blockage of the bottom aerators is prevented. If a low load of the not-fully-loaded aerator chains is maintained, then the outflowing air bubbles will keep the aerator tubes free of blockage. For this purpose, it may then be of advantage if a rigid pipe with a small cross-section is installed at the point of action of the squeeze valve in the interior of the hose line, so that the squeeze valve in that case, because of the rigid pipe, never completely blocks a hose line.

The apparatus and process according to the invention are preferably used for so-called activated sludge plants, but can also be used for so-called pond plants, and also for the aeration of lakes or the like with moving floating aerator chains.

In the accompanying drawings, FIG. 1 is a top view illustrating a single tank or basin of a waste water purification plant. A complete plant may include several basins of this type, as well as additional sludge settling and storage basins. The waste water to be purified is fed into the basin 1 through inlets 2 and leaves the basin through outlets 3 at the opposite side of the tank. It can then be conducted into another activated sludge tank or also into the sludge settling or storage tank. In addition, sludge return lines can be provided, with this in each case depending on the special nature of the plant in which the process is being carried out. Since the invention can be used in the same manner for pond plants operating without sludge return as for activated sludge plants operating with sludge return, details of the individual plants have been omitted in the present embodiment.

In order to be able to purify the waste water, it is necessary to mix activated sludge with the waste water essentially in all parts of the basin and to bring the activated sludge into contact with the waste water with simultaneous availability of oxygen as needed for the process.

Figure 2:
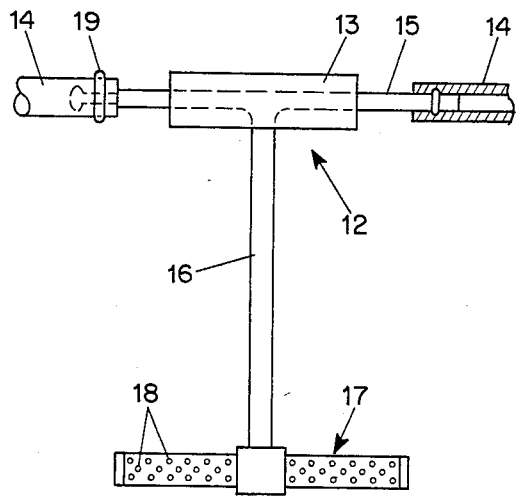
FIG. 2 is an enlarged fragmentary view illustrating a bottom aerator suspended from a chain of the type shown in FIG. 1.

For this purpose, eight floating and moving aerator chains 4 through 11 are stretched over the basin in the embodiment shown in FIG. 1, each carrying individual spaced-apart bottom aerators 12 of the type shown in FIG. 2. The individual aerator chains in each case comprise flexible hose lines 14, which are interrupted in the region of each bottom aerator 12. The connection with the bottom aerators is provided by a connecting pipe 16 from the horizontal upper section 15. The two opposite ends of the section 15 are inserted into the two hose ends of two adjacent sections of the air supply line 14. At the lower end of the connecting pipe 16 there is fastened a distributing pipe 17 parallel to the section 15, which contains numerous air openings 19 on its periphery. Through the air supply line 14 and the connecting pipe 16, the distributing pipe can be supplied with compressed air, which then flows out through the air openings 18. In this embodiment, a float 13, provided in the region above each bottom aerator 12, extends along the longitudinal axis of the support and is intended to ensure the floating support of the bottom aerators 12. The connections between the hoses and the bottom aerator are held together with conventional fastening means, such as, for example, with clamping brackets 19.

In other embodiments (not shown), flexible hose supply lines can also connect the distributing pipes 17 to the air supply line 14 in each case, instead of the rigid connecting pipe 16. The use of several flexible hose supply lines, for example, fastened to each end of every float 13, leads to an increased stability, which is of advantage particularly in connection with the process according to the invention when the individual air input through the individual moving bottom aerators is greater than in the case of a uniform input through many bottom aerators. It is also possible in each case to stretch a support cable over the tanks in parallel with the air supply line 14, on which cable the air supply line hoses 14 are then suitably held or fastened.

The individual floating aerator chains 4 through 11 are stretched loosely over the basin 1, so that, when charged with air, a reciprocating movement of the nature of a lateral deflection of the aerator chains takes place. This lateral deflection is optimally achieved by full loading of the respective aerator chains. The floating aerator chains then move the bottom aerators 12 in a reciprocating movement over the bottom of the basin, preferably at a very short distance from the bottom of the basin, for example, between 10 and 30 cm. By means of this reciprocating movement of the bottom aerators, an oxygen input effective for large regions is achieved, and it is particularly ensured that the bottom aerators arranged near the bottom will again stir up and bring back into circulation any activated sludge that has settled or partly settled on the bottom of the basin.

Figure 3A:
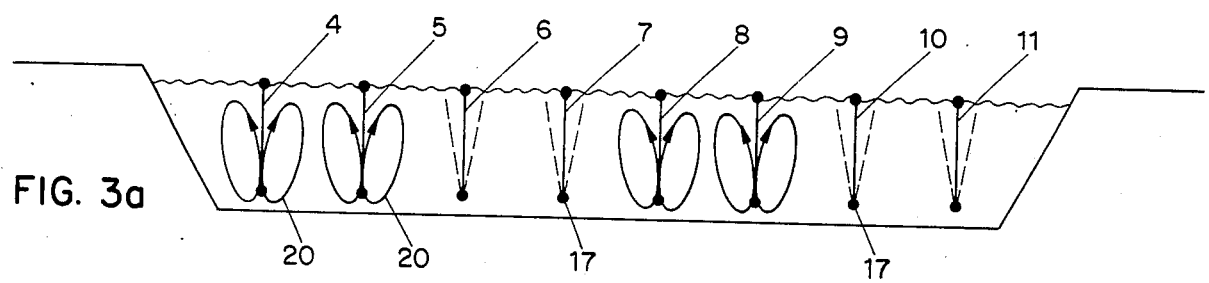
FIGS. 3a, 3b and 3c are schematic diagrams showing a waste water treatment basin and illustrating the wave motion of successive high and low aeration zones through the basin in accordance with the invention.
Figure 3B:
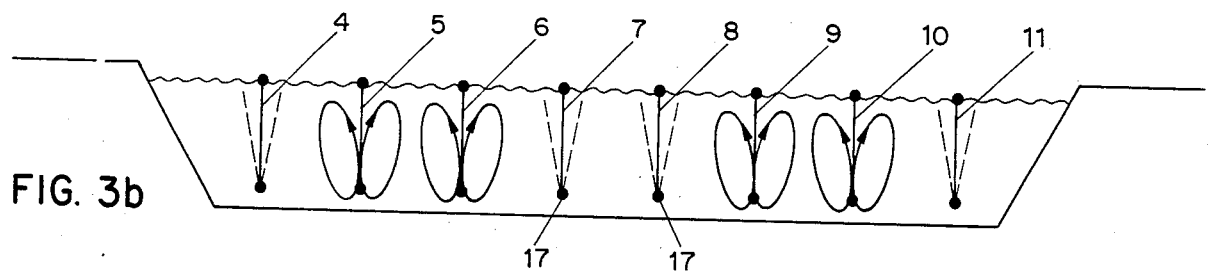
Figure 3C:
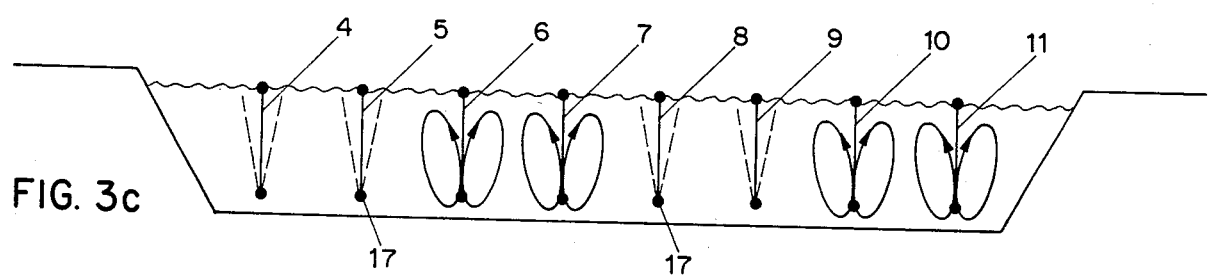

FIGS. 3a through 3c provide a schematic representation of the plant in operation, in a cross-section through the basin shown in FIG. 1. At a first point in time, a situation such as shown in FIG. 3a is obtained. At this point in time, as indicated schematically by the solid circulation arrows 20, the aerator chains 4, 5, 8 and 9 are fully loaded with air. At this point in time, therefore, full aeration is being carried out in only selected spaced zones of the basin, while in other spaced zones, in which the aerator chains 6, 7, 10 and 11 are operating, only an insignificant oxygen input and a slight flow are taking place (broken lines).

After a certain time interval, which depends, for example, on the pollution load of the plant, the fourth and eighth aerator chains are switched off and the sixth and tenth aerator chains are switched on instead as shown in FIG. 3b. The aerator chains 5 and 9 remain fully loaded with air, as before. As a result of this displacement to the right, the zones in which an intensive oxygen input takes place thus migrate to the right in the figure. At a later point in time, as shown in FIG. 3c, the fifth and ninth aerator chains are then switched off and the seventh and eleventh aerator chains are switched on. In the illustrated embodiment, two spaced-apart aerator-chain pairs are thus always loaded in each case. The switching-on of a new aerator chain in each case takes place in the same direction in each aerator-chain pair which, in the case illustrated, is an aerator chain located to the right of an aerator-chain pair.

In this manner a zone of high oxygen input and/or high mixing passes as a migratory wave through the tank, in the illustrated example from left to right. After the plant has been operated for a time in the manner shown in FIG. 3c, the mode of operation shown in FIG. 3a is then again started, etc. It is important for all different conditions that this migrating wave is superimposed and modulated on the moving aerator chains. Only on the basis of the fundamental effect of the moving floating bottom aerators—especially regarding the activated sludge—can the specifically described effects be efficiently accomplished.

It is clear that, depending on the load of the plant or on the desired process-engineering effect, the switching-on and -off of the aerator chains can take place at different time intervals. It is also clear that, instead of the simultaneous loading of two pairs of aerator chains, it is possible in each case to load only two individual aerator chains, for example, first the aerator chains 4 and 8, then the aerator chains 5 and 9, then the aerator chains 6 and 10, and finally the aerator chains 7 and 11.

In the case of plants operating with fewer aerator chains, for example, with only three aerator chains, it may also be sufficient to fully load only one aerator chain in each case with compressed air. It is also clear that whole sections of the tank can be loaded with a different rhythm from other sections or in a fixed manner.

Figure 4:
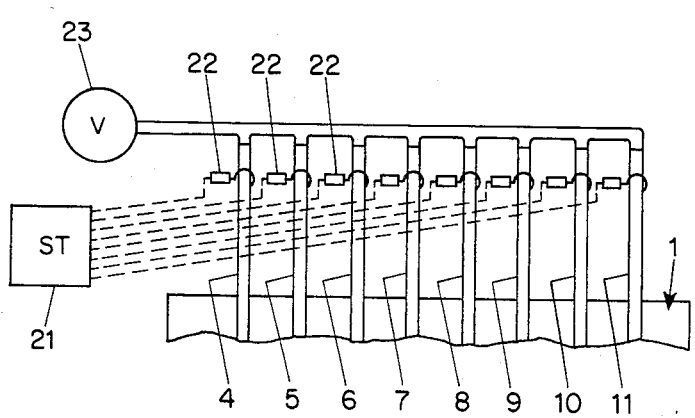
FIG. 4 is a schematic diagram showing a typical valve arrangement for controlling the supply of air to chains of aerators in a waste water treatment basin in accordance with the invention.

The arrangement for controlling the selected air loading of the chains is shown schematically in FIG. 4. A central control unit 21 is provided, which selectively controls a series of squeeze valves 22 associated with the individual aerator chains 4 through 11. The squeeze valves in each case act on the ends of the hose lines 4 through 11 and reduce their transmission cross-section when actuated. The unthrottled valves then in each case aerate the hose lines with the full power that the compressed-air supply source 23 makes available. The squeeze valves 22 can, for example, be controlled electrically or can be charged and actuated with compressed air provided from a central compressed-air control station.

Figure 5:
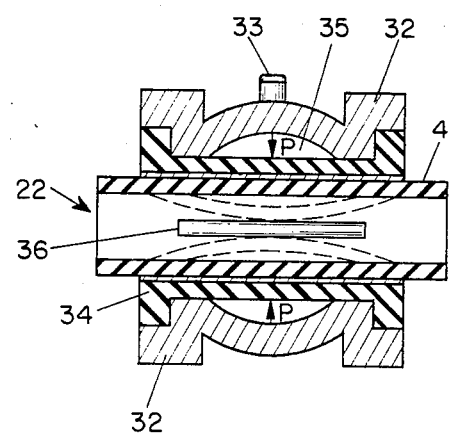
FIG. 5 is a cross-sectional view showing the structure of one form of control device for controlling the flow of air to an aerator chain.

A specific embodiment of a squeeze valve 22, such as can be used in connection with the invention, is illustrated in FIG. 5. The squeeze valve 22 consists essentially of a tubular rubber collar 34, having an internal diameter corresponding approximately to the external diameter of the hose line 4, so that the collar can be pushed conveniently over the hose line 4. A ring flange 32 is fastened over the rubber collar 34 in such a way that a continuous compressed-air space 35 is formed. The flange 32 has a compressed-air connection 33. After the flange 32 has thus been placed over the rubber collar 34 in a sealing manner, a pressure P can be produced in the space 35 by supplying compressed air through the compressed-air connection 33, which causes the rubber collar 34 to move in the direction of the drawn-in arrows P, which leads to a squeezing together of the hose 4. In the interior of the hose line 4 a pipe 36 is supported by means of spacers not shown, permitting a minimal passage of air even when the hose line 4 has been compressed into the extreme squeezed position, such as is shown by the broken lines in FIG. 5.

Depending on the magnitude of the pressure produced in the space 35, different transmission cross-sections of the hose lines can be adjusted.

Figure 6:
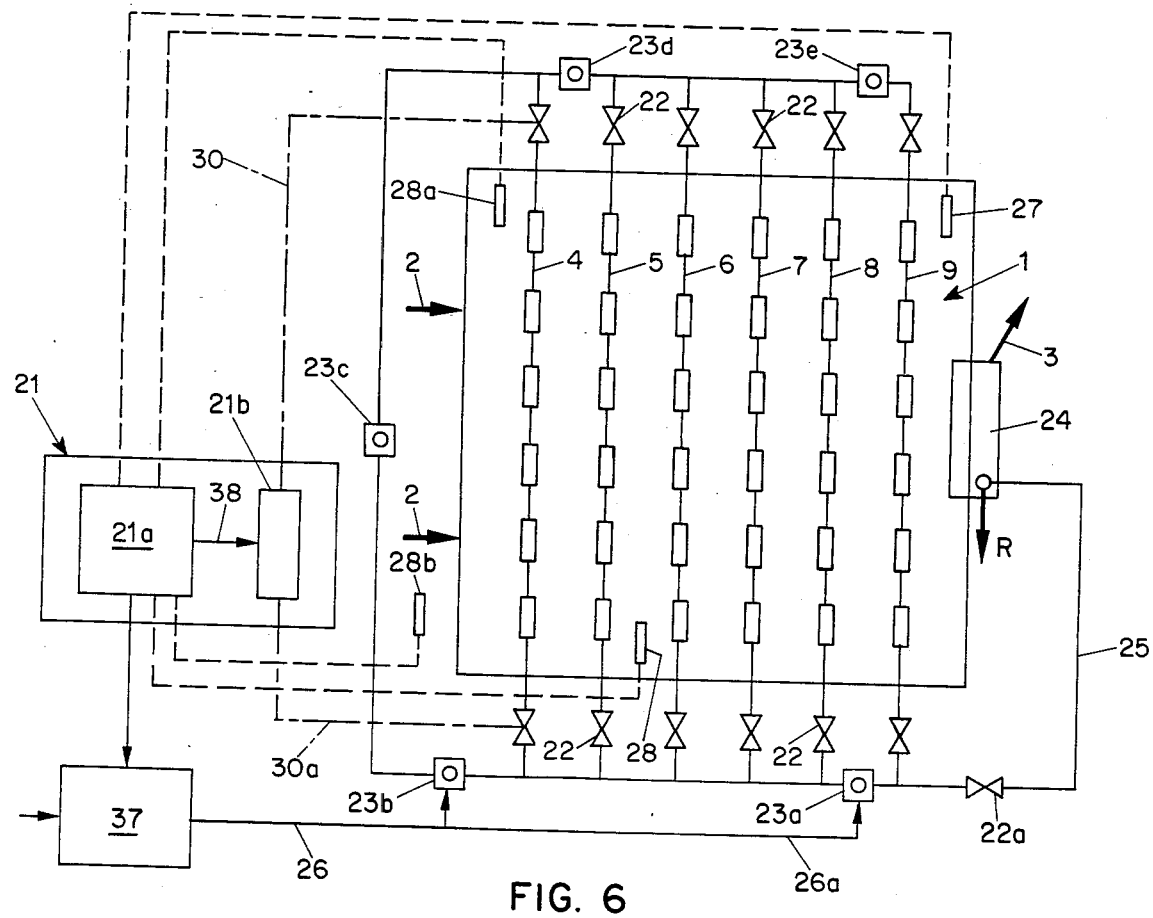
FIG. 6 is a schematic diagram illustrating the arrangement of a representative control system for operating a waste water treatment basin in accordance with the method of the invention.

FIG. 6 is a schematic drawing illustrating a plant that can be operated by the method according to the invention. In FIG. 6 the basin 1 has individual aerator chains 4 to 9 distributed over the basin in the same manner described with respect to FIGS. 1–4 and a squeeze valve 22, which can have the structure shown in FIG. 5, is associated with both ends of each moving aerator chain.

On the discharge side of the basin 1 there is a sludge collecting pipe 24 leading to the outlet 3. Activated sludge can be transported from the sludge collecting pipe 24 through the return line R to the inlet side 2 as required, in order to seed the incoming waste water with activated sludge in the inlet region 2.

The individual moving aerator chains 4 through 9 are connected to each other by means of a compressed air conduit 25 and the individual squeeze valves. Different air compressors 23a through 23e are connected to the conduits 25. These air compressors ensure the desired air pressure and, for this purpose, are supplied with the power required for operation of the compressors from a power supply 37 through a line 26, the connecting lines to the air compressors 23c, 23d and 23e having been omitted for greater clarity. The control of the plant is carried out by a control unit 21, which contains a computer 21a and a distributor unit 21b, which, depending on the switching commands received from the computer 21a, can control each individual valve 22 by means of individual lines 30, only two of which are shown. However, separate air pressure lines of this type lead to each squeeze valve 22, in order to be able to switch the individual squeeze valves 22 separately.

Different measuring probes 27, 28, 28a and 28b are also located in the tank. For example, the oxygen potential at different positions in the basin can be measured continuously with the measuring probes 27 and 28a, whereas, for example, the turbidity of the water is determined with the measuring probe 28. Similar probes can be located at other positions in the basin. The measuring probe 28b, which is located in the inlet 2, measures the quantity of waste water fed in.

All of the signals provided by these probes are transmitted to the computer 21a and are processed in such a way as to determine the required air supply to each chain. The computer then transmits the corresponding signals through the command line 38 to the distributor unit 21b, which then individually charges the valves 22 with compressed air in accordance with the signals.

The plant can naturally also be operated according to fixed programs by means of the computer.

It has been found that, with the process according to the invention or the device according to the invention, it is also possible, in particular, to operate pure activated sludge plants with an extremely small amount of energy as compared with other plants of this type, in which case the advantages of the invention come into effect, in particular, in the case of plants with low pollution loads. By means of the migrating aeration zones or "oxidation waves" according to the invention and superimposing them on the movements of the individual aerator chains, it is possible to achieve a high flexibility and adaptation to a very wide variety of load values and process situations, in which the plant can always be operated economically. Typical migration speeds of the oxidation waves, which ensure an oxygen input in the ratio of 3:1 or even 10:1 with respect to the more weakly aerated or unaerated regions, are approximately 0.01 to 0.06 meter per second. The specific air input in the intensively aerated regions can have values of 0.3 to 1 m$^3$ of air per m$^3$ of water per hour, while in the weakly aerated regions, as mentioned, the aeration can be lower by a factor of 3 to 10.

It has been found that the sludge, once it has been mixed with the waste water, sinks only extremely slowly (typical rates of descent have values of 0.0005 to 0.003 meter per second) so it will take a relatively long time before it would settle on the bottom. Thus, if the bottom region of each zone is agitated by the corresponding bottom aerators with a frequency of approximately one to ten times per hour, with intensive oxygen input, this is sufficient to keep the activated sludge potent, even though anoxic and sometimes anaerobic zones are formed. The plant can nevertheless be operated, in particular, as a regulated, easily controllable activated sludge plant, with the great advantage of flexible processing method and improved treatment and at the same time, the energy expended for mixing is far below 3 watts/m$^3$—which is the lowest value for mixing with moving aerator chains with continuous and equal air flow—which is especially surprising considering that, for surface aerators and fixed installed bottom aerators, a value of approximately 10 watts/m$^3$ is needed for mixing alone.

By modulating the basic movement of the floating chains and attached bottom aerators which provide stirring action from the bottom of the basin with the described wave-like moving load changes or in part of the basin with a load pattern fixed to zones, makes advanced treatment—that is, simultaneous (in one basin) nitrogen and phosphorus reduction by activated sludge—possible in a simple and energy-efficient way. This is something that would never have been expected in simple earthen basins and which also has been looked upon as impossible by wide circles of contemporary experts.

In accordance with the oxygen potential, the detention times in each zone of the basin and the food supply for microorganisms in the waste water, etc., the microorganisms contained in the activated sludge used in the process will carry out different process reactions. For example, car bonaceous BOD removal and nitrification are carried out at higher oxygen potentials, carbonaceous BOD removal combined with denitrification occur under conditions which lack dissolved oxygen but include the presence of nitrites and/or nitrates (anoxic conditions) and phosphate removal is stimulated by conditions in which both oxygen, nitrates or other oxygen sources are lacking (anaerobic conditions). For conventional plants, an oxygen level in the waste water of 2 mg/1 or higher is generally recommended for nitrification.

If the complete basin is run first in the nitrification mode, i.e., with an oxygen level throughout of 2 mg/1 or higher, and then in a denitrification mode under anoxic conditions with a continuous waste water influent to and effluent from the basin, then some of the waste water influent which enters during the denitrification mode will not be oxidized and cannot then be denitrified so that it will pass out of the basin unaffected by the nitrogen removal process, that is, with the harmful ammonia remaining in the water. In addition, if all the water is first nitrified, then this reaction will, due to the consumption of alkalinity, lead to undesirable changes in the pH value, which affects the process negatively.

By establishing zones of high and low oxygen potential in accordance with the invention, the influent waste water must pass through several successive zones providing alternate oxidizing conditions and denitrifying conditions before any influent reaches the outlet. Use of the invention with the constant repetition of the process steps will dramatically increase the overall efficiency of the waste water treatment process. For example, if a process which, for some reason, is run at suboptimum conditions, for example, with a 50% efficiency is carried out twice, then the overall efficiency becomes 75%, and if carried out three times, it becomes 87.5%. Thus, with a plurality of active zones for carrying out successive process conditions repeatedly, the process can be substantially completed despite a lack of complete efficiency in each of the zones.

The comparatively slow intermixing of the zones (low horizontal mixing) also assures that all parts of the influent waste water remain in the basin for a time long enough to complete the process, such as one hour, while the prior art circulating systems described previously, in which waste water passes through a circulatory treatment system in a matter of minutes will only permit treatment of influent waste water for a few minutes before the influent reaches the outlet of the system. This clearly makes the treatment less complete and the effluent quality will quickly deteriorate even during brief and minor upsets in the process.

Therefore, the key to proper treatment of waste water in accordance with the invention is to establish many well-defined zones and change the conditions to which the waste water is subjected in the zones comparatively often so as to ensure that the waste water is thoroughly treated and, at the same time, to keep the microorganisms in suspension in the waste water. In the migrating zones provided in accordance with the invention, relatively narrow zones can be established and maintained in a surprisingly well-defined manner without the use of any mechanical mixers and with expenditure of a minimum amount of energy. This results in excellent treatment and clear, defined process steps, for example, providing simultaneous nitrification/denitrification in the same basin at surprisingly low oxygen levels (oxygen contents of 0.3 mg/l or less) and correspondingly low energy consumption. The repeated change of conditions also stimulates the bacteria to a higher level of activity. Substantial phosphate removal is also accomplished in this way.

A typical basin designed to carry out the invention using, for example, a municipal waste water input of one million gallons per day would typically have a capacity of 0.75–3 million gallons, and optimally have a depth of 8–20 feet.

Although the invention has been described herein with reference to specific embodiments, many modifications and variations of the invention will be obvious to those skilled in the art. Accordingly, all such variations and modifications are included within the intended scope of the invention as defined by the following claims.

I claim:

1. A process for the biological purification of water in a basin having a plurality of aerator chains installed in generally parallel spaced-apart relation across the basin, the aerator chains each including a plurality of bottom aerators located close to the basin floor, the aerator chains being supported so as to move in a reciprocating way during operation so that the bottom aerators periodically move over the basin floor to mix sludge with the water, comprising supplying air sufficient for aeration and mixing of the sludge and waste water in the adjacent portion of the basin to one or more selected aerator chains while supplying less or no air to other aerator chains so that mixing of water and sludge takes place in the portions of the basin adjacent to the selected aerator chains, and periodically changing the selected aerator chains in a progressive manner through the basin to provide one or more zones which move through the basin in wave-like fashion in which mixing of sludge and water occurs.

2. A process according to claim 1 wherein at any time at least two selected aerator chains are aerated fully and at least one unaerated or less-aerated aerator chain is located between two fully aerated chains and, after a specific time interval, the aerator chains adjacent to the two selected aerator chains and on the same side of those chains are aerated fully.

3. A process according to claim 1 wherein the time interval of full aeration of each of the selected aerator chains is controlled as a function of oxygen potential, the pollution load, and the sludge content of the water in the basin.

4. A process according to claim 1 wherein the number of selected fully aerated aerator chains at any time is controlled as a function of the oxygen potential, the pollution load, and the sludge content of the water in the basin.

5. A process according to claim 1 including repeatedly providing full aeration to selected aerator chains in progression through the basin to produce successive waves of full aeration passing through the basin and wherein the rate at which the waves move through the basin successively is controlled so that each aerator chain is fully aerated between about one and ten times per hour.

6. A process according to claim 1 including controlling either the duration of time during which the selected aerator chains are fully aerated or the number of fully aerated chains at any given time, or both, as a function of detected variable parameters related to the required oxygen input.

7. A process according to claim 1 wherein the selected aerator chains are located in a first section of the basin and including supplying air to fully aerate one or more additional aerator chains in a second section of the basin and changing the fully aerated chains in the second section of the basin at a different rate than the rate of change of the selected aerator chains in the first section of the basin.

8. A process according to claim 1 wherein the basin is provided with a sludge return and wherein the return of mixed sludge and return of water from the outlet area to the inlet area of the basin is controlled as a function of the supply of air to the aerator chains.

9. A process according to claim 1 wherein air is supplied to each of the selected aerator chains at a rate which is greater than the rate at which air would be supplied to those chains if all of the aerator chains were fully aerated by the same supply of air.

10. A process according to claim 1 wherein the oxygen potential of the waste water in zones adjacent to the fully aerated chains is high enough to cause nitrogen oxidation of the water and the oxygen potential in the zones adjacent to chains which are not fully aerated is low enough to produce denitrification of the water.

11. A process according to claim 1 wherein the oxygen potentials of the water in the zones which are fully aerated and the zones which not fully aerated are effective to remove phosphorus from the water.

12. A water treatment facility comprising a basin through which water flows in one direction during treatment, a plurality of aerator chains extending in generally parallel spaced-apart relation across the basin, a plurality of bottom aerators included in each aerator chain at locations adjacent to the bottom of the basin, the bottom aerators and the aerator chains being arranged to move with respect to the bottom of the basin when the aerator chain is fully aerated to mix sludge with the water and supply air to the water, air supply means, and control means for controlling the supply of air from the air supply means to each of the aerator chains selectively and causing spaced aerator chains in the plurality to be fully aerated and at least one aerator chain between the spaced chains to receive less or no air and for periodically changing the aerator chains which are fully aerated in a progressive manner along the length of the basin to produce aerated zones which move in a wave-like fashion through the basin.

13. A water treatment facility according to claim 12 wherein the control means includes throttle valve means associated with each of the aerator chains to control the flow of air to the bottom aerators supported by the corresponding aerator chain.

14. A water treatment facility according to claim 13 wherein the throttle valve means is a squeeze valve.

15. A water treatment facility according to claim 14 including a rigid pipe disposed within the squeeze valve to prevent a complete shut-off of air by the valve.

16. A water treatment facility according to claim 12 including detection means for detecting one or more of the oxygen potential, the pollution load, and the sludge content of the water in the basin and wherein the control means is responsive to the detector means to control the supply of air selectively to the plurality of aerator chains.

17. A water treatment facility according to claim 12 wherein the control means is responsive to the detector means to control the aerator chains selectively to provide relatively high- and low-oxygen-potential zones which are effective to cause successive nitrogen oxidation and denitrification of water in the basin.

18. A water treatment facility according to claim 12 wherein the control means is responsive to the detector means to control the aerator chains selectively to provide successive zones having different oxygen potentials which are effective to remove phosphorus from the water.

* * * * *

UNITED STATES PATENT AND TRADEMARK OFFICE
CERTIFICATE OF CORRECTION

PATENT NO. : 4,797,212
DATED : January 10, 1989
INVENTOR(S) : Reinhart von Nordenskjold It is certified that error appears in the above-identified patent and that said Letters Patent is hereby corrected as shown below:

Column 3, line 28: The word "mad" should read --made--.

Column 9, line 56: The word "seventhand" should read --seventh and--.

Column 12, line 35: The words "car bonaceous" should read --carbonaceous--.

Signed and Sealed this

Twenty-sixth Day of September, 1989

Attest:

DONALD J. QUIGG

Attesting Officer

Commissioner of Patents and Trademarks